Figure 1:
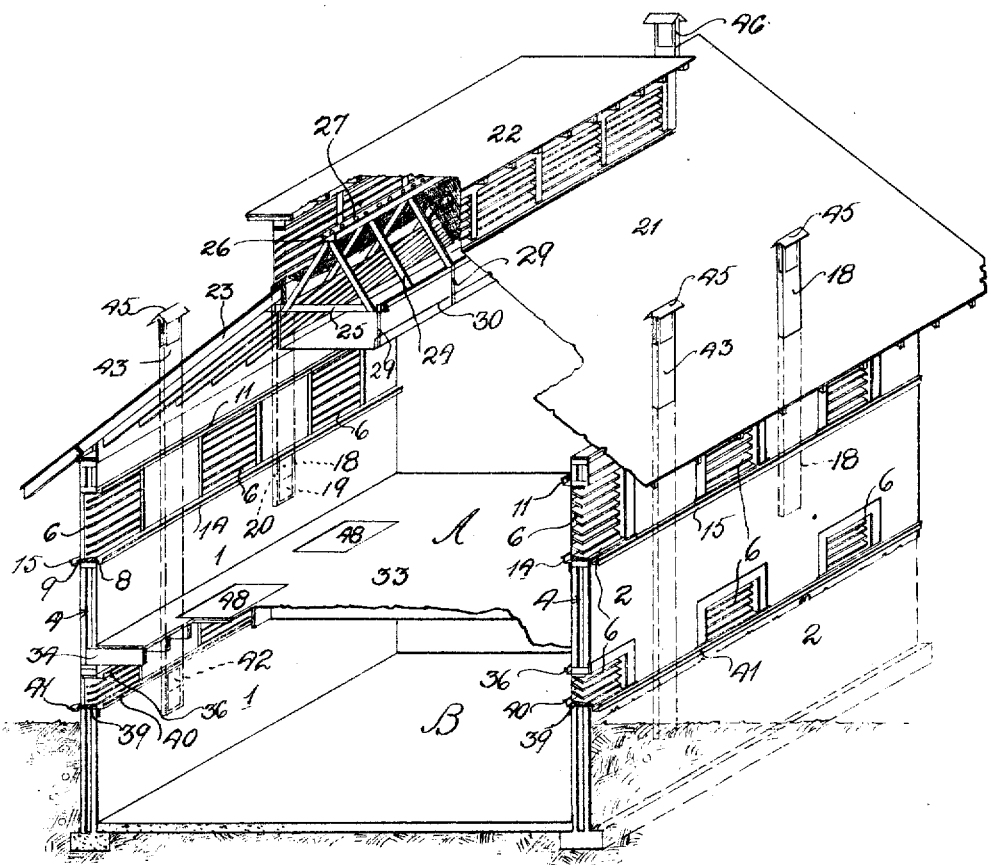

T. FELLOWS.
COOLING SYSTEM FOR PACKING HOUSES.
APPLICATION FILED SEPT. 7, 1909.

954,674.

Patented Apr. 12, 1910.
4 SHEETS—SHEET 1.

Witnesses:
Frank N. Sherman
Harry E. Jones

Inventor:
Thomas Fellows
by Anton Gloetzner Jr.
His Attorney

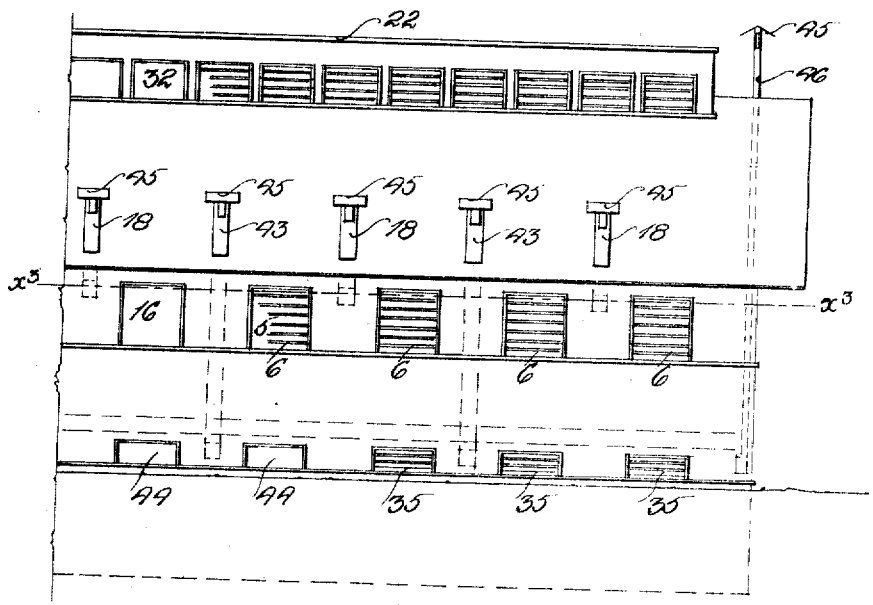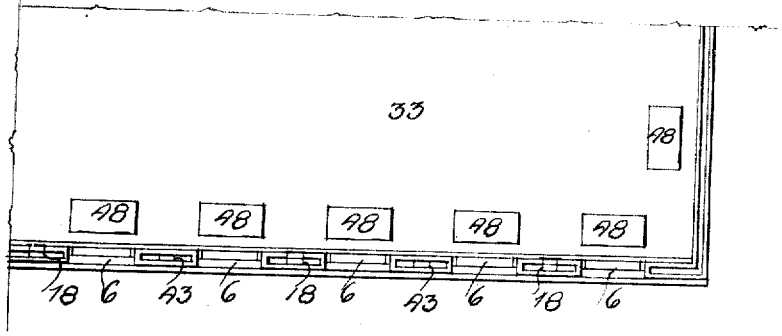

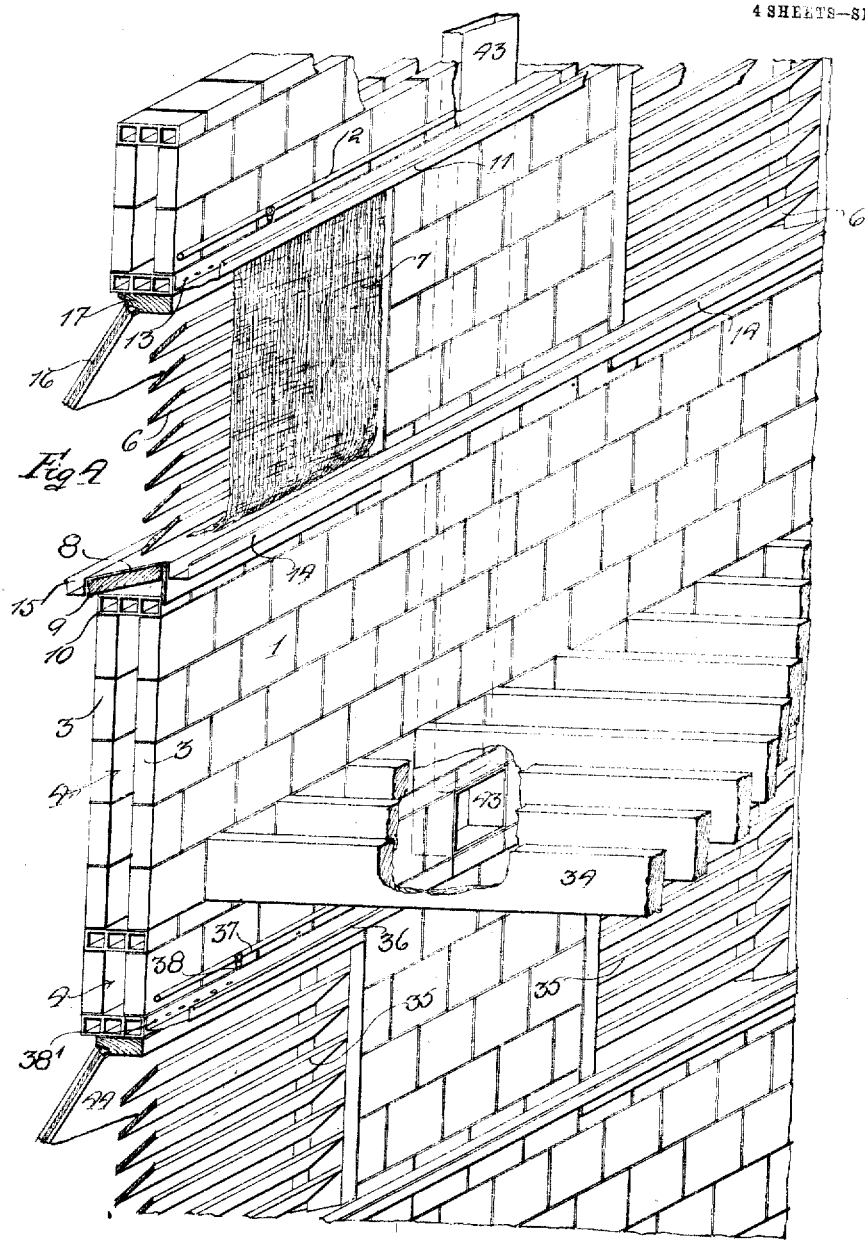

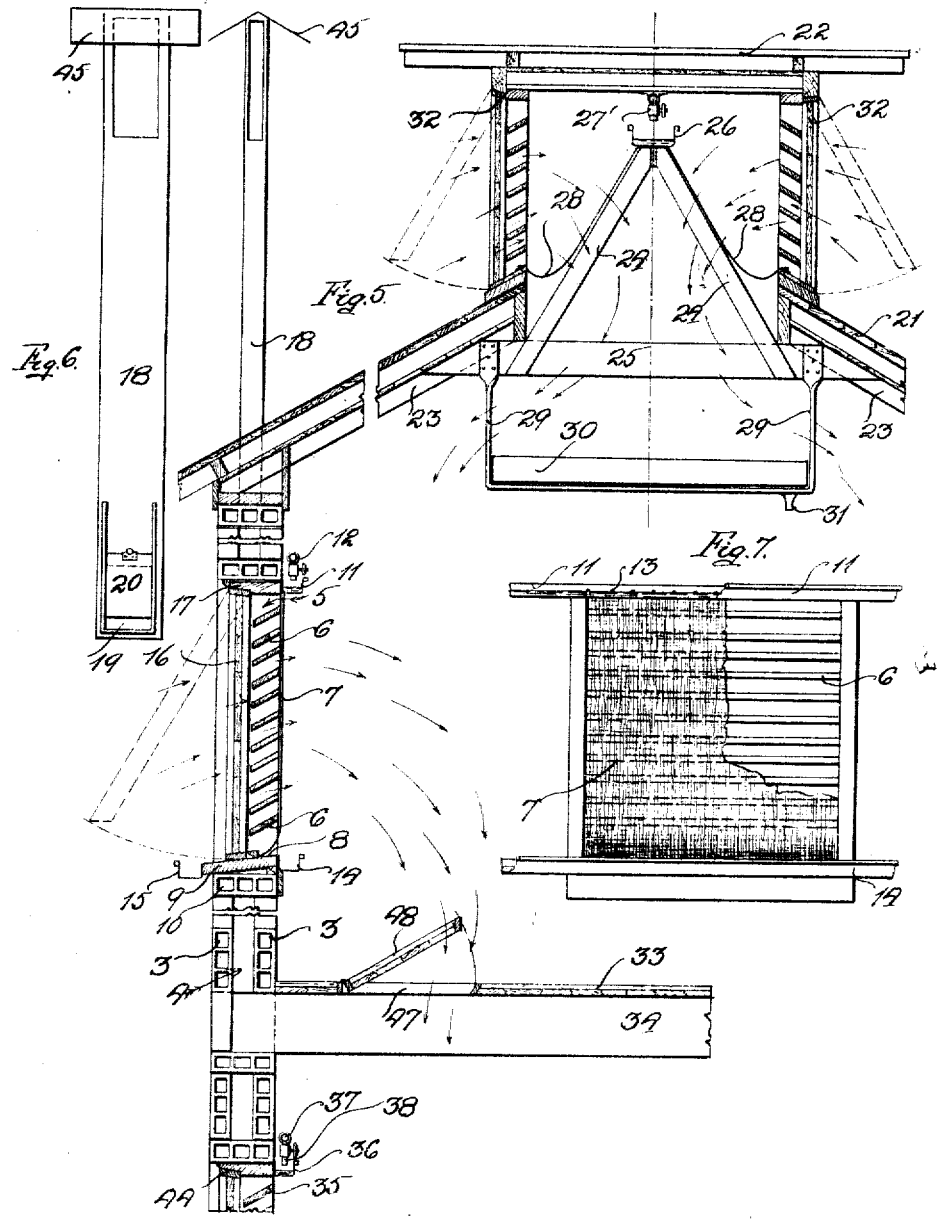

UNITED STATES PATENT OFFICE.

THOMAS FELLOWS, OF LOS ANGELES, CALIFORNIA, ASSIGNOR OF ONE-HALF TO MILWAUKEE BUILDING COMPANY, OF LOS ANGELES, CALIFORNIA, A CORPORATION OF CALIFORNIA.

COOLING SYSTEM FOR PACKING-HOUSES.

954,674.  Specification of Letters Patent.  Patented Apr. 12, 1910.

Application filed September 7, 1909. Serial No. 516,614.

*To all whom it may concern:*

Be it known that I, THOMAS FELLOWS, a citizen of the United States, residing at Los Angeles, in the county of Los Angeles and State of California, have invented a certain new and useful Cooling System for Packing-Houses, of which the following is a specification.

This invention relates to building constructions and has particular reference to a cooling system for packing houses for citrus and other fruits, and especially lemons.

In the arid regions and valleys of the interior, the lack of moisture in the air wilts the lemons in storage by the liberation of the citric acid contained therein, and in humid territories, the hygroscopic nature of the lemons, absorbs the moisture, causing a disruption or dissolution of the vascular cells which results in rot. In order therefore, to preserve lemons in storage, which is necessary on account of the variability of the market conditions, a mean between the humid and the dry atmosphere is required, and to this end I have devised the present structure for the storing of fruits, one of the objects being to preserve at all times an equable temperature with the proper quantity of moisture requisite to protect the lemons against desiccation and decay.

Another object of this invention, is to provide a system for cooling and maintaining in a cool condition the atmospheric air in a packing house without resorting to artificial refrigeration and to regulate such cooling as conditions may require.

A further object of this invention is to provide a packing house construction in which humidity may be supplied to the dry air in exactly the proportions needed by the lemons, and in which saturated air may be dried in case an excess of humidity exists.

With these and other objects in view, this invention consists of the features, details of construction and combination of parts as will be described in connection with the accompanying drawings and then be more particularly pointed out in the claims.

In the drawings, Figure 1, is a perspective view showing one of the gable ends of the construction removed to disclose interior arrangement. Fig. 2, is a fragmentary side elevation. Fig. 3, is a sectional fragmentary plan view, on lines $x^3$—$x^3$ Fig. 2, showing the trap doors in the tight floor. Fig. 4, is a fragmentary perspective view showing the wall construction and the invention as applied thereto. Fig. 5, is a cross section of the wall and roof construction. Fig. 6, is a plan detail of the vent, and Fig. 7, is a detail of one of the louvers showing the strip of textile fabric thereon, the water supply trough and the water drain trough.

The building consists of the side walls 1 and 2, and the end walls for the same constructed of hollow terra-cotta bricks 3, more clearly shown in Fig. 4, and laid to form insulated compartments 4, forming dead air chambers which insulate the exterior air from the interior air and prevents the ingress of the warm outside air to the interior.

At determined intervals in the upper parts of the walls 1 and 2 are a plurality of openings 5, provided with air deflecting vanes 6, through which the air courses to the interior of the building. These openings as described are substantially louver windows, and fastened to the upper sills thereof are strips of textile fabric, such as burlap, canvas and the like, as shown at 7, while the lower ends thereof are riveted or tacked to a plate 8 secured to the sills 9, which rest on and at an angle to the transverse layer of brick 10, forming the closure for the dead air wall spaces 4. By means of a trough 11, which extends longitudinally of the length of the building walls 1 and 2, and to which water is supplied by a supply pipe 12, these fabric strips are saturated or provided with a required amount of moisture, escaping through the perforations 13, provided in the part of the trough 11 adjacent the burlap. The excess of water which is not absorbed by the fabric, or which is not vaporized by the inflowing currents of air, drips into the drip trough 14 and the balance of excess water, following the curvature of the burlap at the bottom, escapes over the plate 8, into the drain trough 15 provided on the outside of the walls 1 and 2.

When the temperature of the compartment A has been reduced to the degree which the citrus fruit requires for its preservation the further lowering of the temperature is prevented by the shutters 16 hingedly secured to the tops 17 of the window casings, which shutters when closed exclude the air.

In order to remove from the compartment A vapid or stagnant air, which has a deteriorating effect upon the fruit, I provide vent pipes 18 in the hollow walls 1 and 2, which vents are provided with openings 19 affording communication between the outside atmosphere and the interior of the building. These openings are controlled by slides or doors 20 from the inside of the compartment A, and by this means the vitiated or contaminated air within may be drawn out without affecting the cooling process.

Where in regions remote from large bodies of water, the air is devoid of or possesses an extremely low percentage of moisture, the arrangement thus far described will tend only to extract by evaporation, the thermal units from the incoming air, and in this manner modify the atmosphereic condition in the compartment. Since, however, lemons and other citrus fruits, to be properly preserved in storage, require, as is well known, cold and moisture in proportion, this arrangement alone would not conduce to improving the present primitive conditions or methods of cooling and caring for the fruit. For this reason I have made the provision for supplying humidity to the compartment A, shown in Fig. 1, and more particularly in Fig. 5.

The roof 21 is capped by a dormer louver 22 resting on the main rafters 23 of the building. Within said dormer louver 22 and extending slightly below the plane of the roof 21, is a frame 24, having the shape of an inverted V, and supported by crossties such as shown at 25. On the apex of said inverted V-shaped frame is mounted a trough 26, provided with perforations 27 in the sides thereof, and through which perforations water, supplied to the trough from a suitable supply seen at 27', flows onto and dampens or saturates strips of burlap or other textile fabric 28 covering the inclined sides of the inverted V-shaped frame 24. Suspended from said frame 24 by hangers 29, is a pan 30 arranged to receive the surplus water from the burlap, and a pipe 31 serves to drain the water which has collected in said pan.

As seen in Fig. 5, suitable shutters 32, are hinged to the frame work of the dormer louver, whereby the production of humidity may be regulated by opening or closing the same, thereby cutting off or admitting the air to the interior. When lack of humidity is experienced in the compartment A the shutters 32 of the dormer louver are opened, and the shutters 16 of the wall louvers are closed. The air induced through the saturated burlap carries with it a certain percentage of moisture, which condenses, and descends as a precipitate within the compartment A. When the percentage of humidity necessary for certain purposes has been produced, as is readily ascertainable hygrometrically, the dormer louver shutters 32 are closed, and the shutter 16 for the wall louvers, opened to effect the necessary cooling of the chamber. This humidity arrangement serves also to furnish the proper quantity of oxygen for the workman. The compartment A or main floor is separated from the compartment or basement B generally used for storing, by a tight floor 33 supported on the joists 34. In the upper portions of the walls of the basement, I provide at intervals wall louvers 35, similar to those described in connection with the walls forming the compartment A. A water trough 36 extends longitudinally of the length of said basement walls, and being mounted on the casings of the louvers, supplies the burlap stretched over the same with moisture the water being delivered from a pipe 37 through faucet 38, and escaping from said trough through perforations 38'. On the sills 39 of said louvers is fastened a trough 40 to catch the drippings from over-supply to the burlap, and on the outside of said basement walls, another trough 41 is provided to drain the excess water from the textile fabric.

When the air becomes unsuited for the fruit stored in the compartment B, that is, when for length of time and lack of circulation, it stagnates and becomes insipid, the slides 42 provided in the vent pipes 43 are opened causing the air in the basement to escape to the atmosphere by the circulation resulting from such action. These slides being independent of each other and placed at stated intervals in the walls of the basement, it is possible to create separate air currents in separate portions of the basement, and in this manner to thoroughly free the vitiated or stagnant air therefrom, or only a part of the same, a condition arising where the fruit is stored in superposed tiers reaching to the ceiling, which prevent an equal distribution and maintenance of the required quality of air. Shutters 44 are hingedly mounted on the upper part of said basement louvers to control the temperature therein. As seen in Figs. 1 and 2, these vent pipes are open at the sides and top thereof, the top being covered by hoods 45 which are covered or coated with suitable means for refracting the heat. At each gable end wall of the structure, similar vents may be provided, as shown at 46, in Fig. 1.

To supply or replenish the supply of humidity to the air in the basement or compartment B, the shutters 32 of the dormer louver 22 are opened, causing thereby a precipitation of moisture within when the water has saturated the burlap covering the inverted V-shaped frame. The descending currents of moisture laden air are then caused to course through the openings 47 provided for this purpose in the tight floor 33. These openings 47 are closed from communication with the compartment or main floor A by trap doors 48 hinged to the tide floor. When a sufficient amount of humidified air, as indicated by the hygrometer, has descended into the basement, the trap doors are closed, and further precipitation of moisture in the compartment A precluded by closing the shutters for the dormer louver 22. The wall vents 18, 43, and 46, aside from serving to relieve the compartments of impure or stale air, may be used to dry the air when the amount of humidity is greater than that required for specified purposes.

It will be seen from the construction as above described, that by the embodiment of the novel features in a packing house, an equable temperature may at all times be had and maintained, and that those conditions comitant with the preservation of fruit in storage previous to shipping, are all answered by the provisions incorporated in the system. Particularly is this the case where in the torrid and dry valleys, the percentage of moisture in the air is almost infinitesimal, and the result of such dearth of moisture is readily perceptible in its action upon the fruit. And only by extracting from the heated air the maximum quantity of caloric units during the progress of induction in the interior of the packing house, and regulating the atmospheric conditions, is it possible to satisfactorily dispense with artificial refrigeration to properly insure the stored fruit against the decomposing action of air bodies.

What I claim, is:—

1. A building construction for packing houses and the like having walls provided with openings, strips of fabric covering said openings, means to supply moisture to said strips to cool the interior of said packing house, and means to produce humidity within.

2. A building construction for packing houses and the like having walls and a roof, said walls being provided with openings, strips of fabric covering said openings, means to supply water to said strips, and means in said roof to produce humidity.

3. A building construction for packing houses and the like having walls and a roof, said walls being provided with openings, strips of fabric covering said openings, means to supply water to said strips, means in said roof to produce humidity, and means to regulate such means.

4. A building construction for packing houses and the like having walls provided with openings, fabric coverings for said openings, means to supply moisture to said coverings to cool the interior atmosphere, and means to modify the hygrometric state of the air within.

5. A building construction for packing houses and the like having walls and a roof, said walls being provided with openings, fabric coverings for said openings, means to supply moisture thereto to cool the interior atmosphere, means in said roof to modify the hygrometric state of the air within, and means to control said means.

6. A cooling system for packing houses and the like having windows, comprising strips of fabric covering said windows, water receiving and distributing troughs on said windows to supply moisture to said strips and cool the interior of the packing house, drain troughs at the bottom of said windows, and means in the top of said building to produce humidity within same.

7. A packing or other house having walls provided with louvers a main floor, basement and roof, moisture absorbing means covering said openings, means to supply moisture thereto, vents in said walls a dormer louver on said roof, means in said dormer louver to produce humidity, and means to establish communication between said main floor and basement.

8. A cooling system for packing and other houses, comprising air cooling means provided in the walls thereof, means to control said means, means in the roof of said packing or other house to produce humidity and means to control said means.

9. A walled structure divided into two compartments, the walls of the same being provided with louvers, strips of water absorbing material covering said louvers to cool the air within said compartments, means to supply water thereto, shutters for said louvers to regulate the temperature within said compartments vents in the walls thereof, to dry the air, and means to produce humidity with said compartments, said means comprising a dormer louver, a frame therein provided with a covering of textile fabric, a trough to supply water thereto, and shutters on said dormer louver to prevent the ingress of air.

In testimony whereof I affix my signature in the presence of two witnesses.

THOMAS FELLOWS.

Witnesses:
 FRANK P. SHERMAN,
 HARRY E. JONES.